No. 779,263. PATENTED JAN. 3, 1905.
B. G. BUTLER.
AXLE NUT.
APPLICATION FILED JULY 6, 1904.

WITNESSES:
Jos. A. Ryan
F. D. Ammen

INVENTOR
Benjamin G. Butler
BY
ATTORNEYS

No. 779,263. Patented January 3, 1905.

UNITED STATES PATENT OFFICE.

BENJAMIN GARY BUTLER, OF SUMTER, SOUTH CAROLINA, ASSIGNOR OF THREE-FOURTHS TO T. REID ORD, EDNA A. MORTIMER, AND ARCHIBALD CHINA, OF SUMTER, SOUTH CAROLINA.

AXLE-NUT.

SPECIFICATION forming part of Letters Patent No. 779,263, dated January 3, 1905.

Application filed July 6, 1904. Serial No. 215,552.

*To all whom it may concern:*

Be it known that I, BENJAMIN GARY BUTLER, a citizen of the United States, and a resident of Sumter, in the county of Sumter and State of South Carolina, have made certain new and useful Improvements in Axle-Nuts, of which the following is a specification.

My invention relates to axle-nuts such as used for retaining the wheels of vehicles upon the axles.

The object of the invention is to produce a nut of simple construction which is adapted to carry a quantity of oil or lubricant and provided with efficient means for supplying the rubbing surfaces with the lubricant. Arrangement is made for preventing waste of the lubricant and for facilitating the replenishing of the same.

The invention consists of the construction and combination of parts to be more fully described hereinafter and definitely set forth in the claims.

Figure 1:
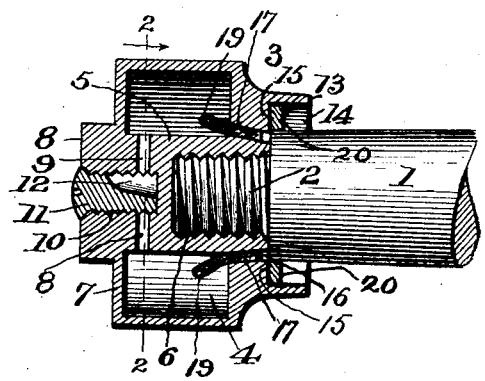
Figure 2:
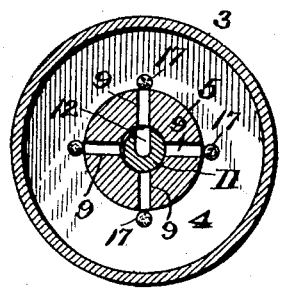
Figure 3:
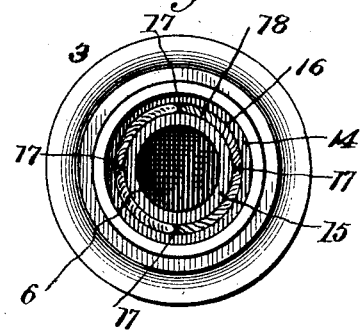
Figure 4:
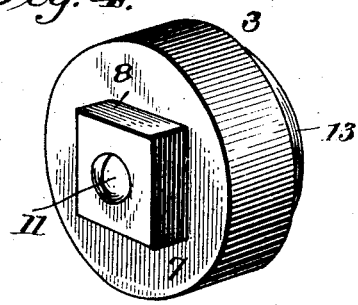
Figure 5:

In the drawings which fully illustrate my invention, Figure 1 is a longitudinal section through the nut, showing a portion of an axle arm or spindle to which the same is attached. Fig. 2 is a vertical section taken substantially on the line 2 2 of Fig. 1. Fig. 3 is an elevation showing the inner face of the nut. Fig. 4 is a perspective of the nut, representing the same as detached. Fig. 5 is a longitudinal section through a screw-plug used in connection with the nut.

Throughout the drawings and specification the same numerals of reference denote like parts.

Referring more particularly to the parts, 1 represents the arm or spindle of an axle, the same having a reduced extremity 2, which is threaded, as shown, to receive the nut 3 in the usual manner.

The nut 3 consists of a hollow cylindrical body the interior whereof constitutes a reservoir 4, intended to receive an oil or similar lubricant. The central portion of the nut 3 is formed into a hub 5, as shown, the same having a threaded bore 6, to which the aforesaid reduced extremity 2 directly attaches.

The outer face 7 of the nut is substantially flat, as shown, and provided with a boss 8, which is of angular form and preferably square, as shown. This boss 8 facilitates the attachment of the nut by means of an ordinary wrench.

For the purpose of enabling the reservoir 4 to be filled with oil, the hub 5 is provided in its outer portion with diametrically-disposed ducts 9, and these ducts communicate, as shown, with a threaded opening or bore 10, which receives a screw-plug 11, as indicated, the same having, preferably, a countersunk head. The side of this plug 11 is provided with a longitudinally-disposed cut or groove 12, which groove when the plug is tight is wholly concealed within the nut. When it is desired to fill the reservoir, this screw is partially unscrewed, so as to expose the outer portion of the groove 12, so as to admit oil into the threaded bore. This oil of course immediately finds its way through the ducts 9 into the reservoir.

The inner face of the nut is provided with an annular flange 13, so as to form an annular space 14, receiving the extremity of the hub in a well-known manner. In this way an annular face 15 is formed between the flange 13 and the threaded bore 6. This annular face 15 is provided with an annular groove or depression 16, and this groove communicates with a plurality of ducts 17, which lead inwardly to the reservoir 4. As shown, these ducts are preferably four in number and they converge in the direction of the wheel. In the groove 16 four wicks 18 are attached, the same consisting, preferably, of a fibrous material, such as felt or cotton, the extremities 19 of the same passing inwardly through the ducts 17 and projecting into the interior of the reservoir, as shown. On the inner face of the nut there is provided a leather washer 20, as indicated, and the shoulder at the extremity of the spindle preferably substantially covers the groove 16, as shown most clearly in Fig. 1.

It should be understood that the wicks 18 afford means for preventing a waste of the oil in the reservoir. At the same time they supply the necessary quantity of oil to the rubbing faces.

Evidently the nut is of a very simple construction, readily attached, and readily kept intact. The presence of the wicks also prevents the passage of dirt or dust into the interior of the reservoir.

Having thus described my invention, what I claim as new, and desire to secure by Letters Patent, is—

1. An axle-nut having a reservoir and a centrally-disposed threaded bore for attaching the same, the body of said nut having ducts leading to the inner face thereof, and wicks lying in said ducts and extending into said reservoir.

2. An axle-nut having a reservoir and a centrally-disposed threaded bore for attaching same, the inner face of said nut having an annular groove therein, the body of said nut having ducts communicating with said groove and leading from said reservoir, and wicks, the bodies whereof lie in the said groove and the extremities whereof pass through said ducts to said reservoir.

3. An axle-nut having a centrally-disposed hub and a reservoir disposed thereabout, said hub having diametrically-disposed ducts therein communicating with said reservoir, a removable plug, the inner extremity whereof lies adjacent to said ducts, said plug having a groove in the side thereof normally concealed within said nut, the body of said nut having other ducts leading from said reservoir to the inner face of said nut.

4. An axle-nut having a centrally-disposed hub with a threaded bore for attaching same, a reservoir disposed about said hub, said hub having diametrically-disposed ducts beyond said threaded bore communicating with said reservoir, the outer face of said nut having an angular boss thereon, a screw-plug mounted in said outer face and having a groove in the side thereof which may communicate with said ducts, the inner face of said nut having an annular groove with a plurality of ducts communicating therewith and leading from said reservoir, and a plurality of wicks, the bodies whereof are disposed within said annular groove and the extremities whereof extend through said last ducts and into the interior of said reservoir.

BENJAMIN GARY BUTLER.

Witnesses:
L. D. JENNINGS,
D. G. ZEIGLER.